United States Patent [19]

Avila

[11] Patent Number: 4,799,049
[45] Date of Patent: Jan. 17, 1989

[54] IMAGE POSITION CONTROL

[76] Inventor: Harold C. Avila, 5399 Sierra Vista Ave., Riverside, Calif. 92505

[21] Appl. No.: 694,816

[22] Filed: Jan. 25, 1985

[51] Int. Cl.$^4$ .............................................. G09G 1/00
[52] U.S. Cl. ................................. 340/709; 340/710; 74/471 XY
[58] Field of Search ...................... 340/709, 710, 706; 178/18; 74/471 XY, 471 R, 491, 198; 338/123, 132, 133

[56] References Cited

U.S. PATENT DOCUMENTS

| | | | |
|---|---|---|---|
| 1,613,994 | 1/1927 | Grose | 338/123 |
| 3,820,641 | 6/1974 | Bonst et al. | 74/471 R |
| 3,916,100 | 10/1975 | Azuma | 178/18 |
| 4,369,439 | 1/1983 | Broos | 340/710 |
| 4,543,571 | 9/1985 | Bilbrey et al. | 340/709 |
| 4,561,183 | 12/1985 | Shores | 340/710 |
| 4,562,347 | 12/1985 | Hovey et al. | 74/471 XY |

OTHER PUBLICATIONS

Leon, N., "Thumbwheel Positional Control Unit", IBM Technical Disclosure Bulletin, vol. 21, #7, Dec. 1978., pp. 3206, 3207.

Primary Examiner—John W. Caldwell, Sr.
Assistant Examiner—Alvin Oberley
Attorney, Agent, or Firm—Morland C. Fischer

[57] ABSTRACT

A control that uses movement to position an image on a screen for use with means for detecting the movement and a microprocessor that interprets the movement detected and means for displaying an image on a screen, comprising a body and a bar having a bar axis coupled to the body so that the bar is rotatable with respect to the body about the bar axis and is slidable with respect to the body in a direction parallel to the bar axis thereby permitting movement of the bar with respect to the body which is the movement that is used to position an image on a screen.

12 Claims, 1 Drawing Sheet

U.S. Patent    Jan. 17, 1989    4,799,049
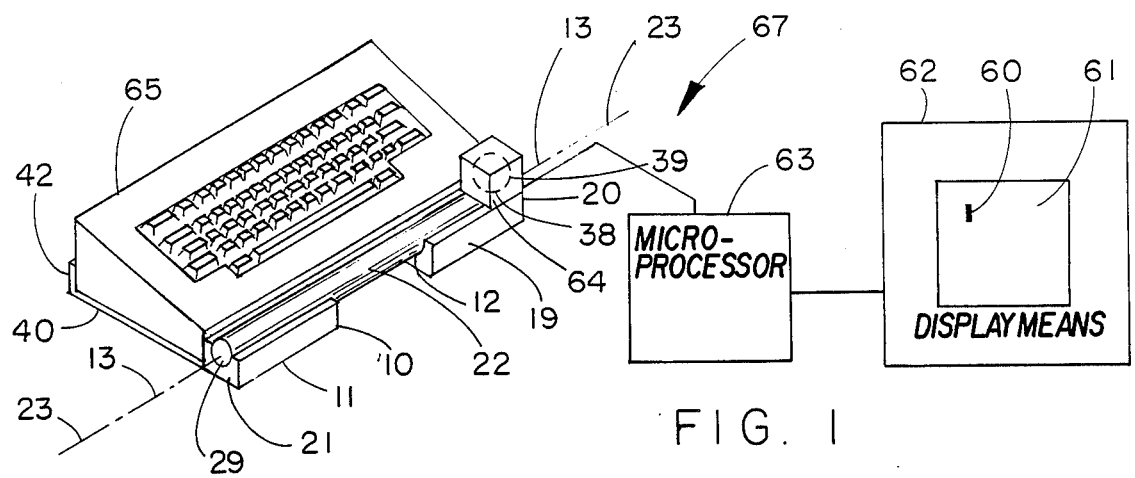
FIG. 1
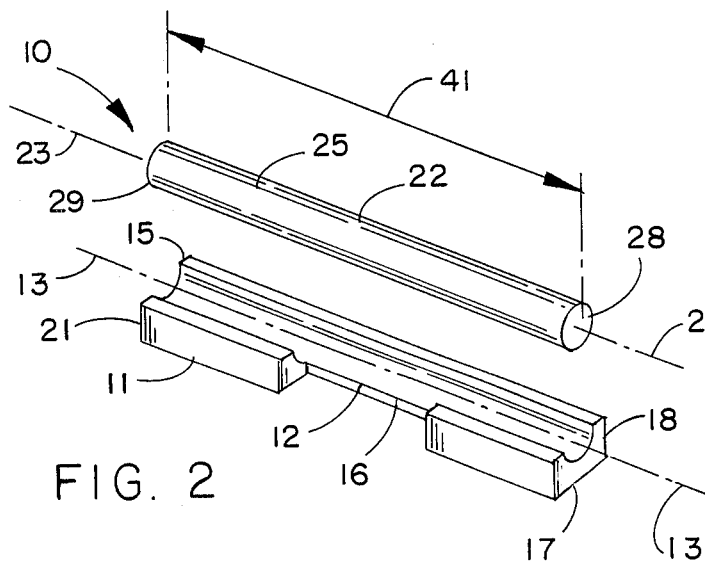
FIG. 2
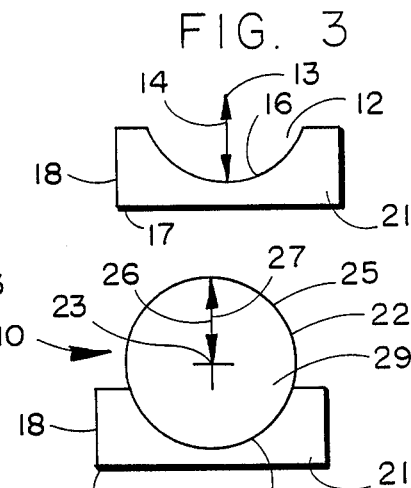
FIG. 3
FIG. 4
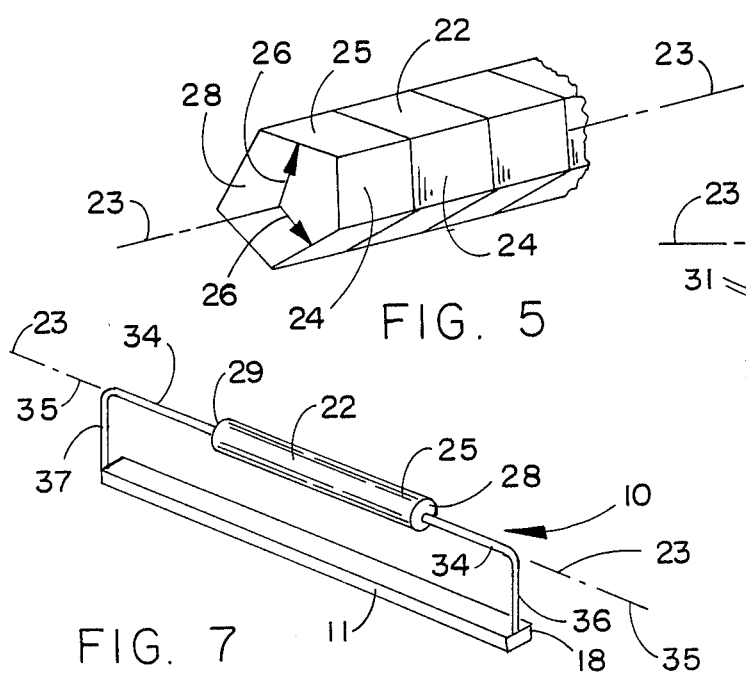
FIG. 5    FIG. 7
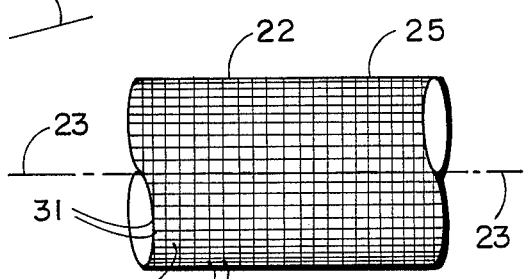
FIG. 6
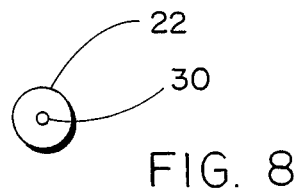
FIG. 8

IMAGE POSITION CONTROL

BACKGROUND OF THE INVENTION

The use of computers with keyboards for providing input to the computer and video display tubes for seeing the information that is being put into the computer is very common. Many homes have what is called a personal computer or a home computer. Home video games are also quite common as are video arcade games. Most of the foregoing depend on an image on a screen commonly called a cursor in order to perform a specific function. For example in what is commonly called a computer typewriter a cursor is moved on a screen to indicate where a correction is to be made or the cursor may be used to select a particular mode of operation. A cursor may also be used to draw lines on a screen commonly called a video display tube. In many of the foregoing a keyboard is used to provide information to the computer. In many of these application swiftness and speed and accuracy are very desirable. For example in a computer typewriter situation the typist generally is trying to type things as fast as possible and the typing will be displayed on a video display tube which has a screen. The typist will try to make corrections as quickly as possible by moving an image on a screen such as a cursor. In the prior art this is accomplished by a device commonly called a mouse which appears to be a spherical ball which protrudes through the bottom of a housing. Pushing on the mouse will cause it to move and cause the ball in it to rotate which in turn will cause an image on a screen to move. The mouse has no inherent up, down, left or right sense of direction since it is a sphere and it can be rotated in any direction. This makes it very difficult to use in a typing situation where the typist is attempting to type as fast as possible while looking at a screen without looking at the mouse. The typist would have to move the mouse in several directions before finally getting the cursor to the desired point. Other prior art devices used in a typewriter situation include buttons that can be pushed to cause movement of the cursor. For example one button could be pushed to provide up direction while another button could be pushed to provide down direction and so forth. The use of buttons does not allow the typist to speed up the process since the movement of the cursor will be either constant or depend on tapping of the button.

Another prior art device is the stick that protrudes up from a base. The stick is generally moved forward to cause the cursor to move up and the stick is moved to the left to cause the cursor to move to the left as is commonly done with many home video games.

All of the prior art devices that control the position of an image on a screen are inconvenient to use because they are located at a remote point such as the mouse is which makes them difficult to use. In particular where one wishes to draw on a screen such as a video display tube using a cursor as the point that causes the line to be drawn it is very difficult to use a mouse to draw a straight line because it is difficult to cause a sphere to move in a straight line. In other types of devices in the prior art it is equally difficult to draw a precise distance using a stick or a pushbutton because one must estimate how long the stick must be pushed up to cause up movement of the cursor or how long the button must be pushed to cause the movement desired which results in it being almost impossible to precisely draw a line of desired length.

Thus there are positioning systems in the prior art for positioning images on a screen however each has serious drawbacks. There does exist in the prior art means for detecting movement of the invention herein and microprocessors that may be coupled to the means for detecting movement wherein the microprocessor interprets the movement detected and means for displaying the microprocessor's intrepretation on a screen. However, there is nothing in the prior art like the invention herein that provides the movement that can be detected by devices in the prior art.

It is unknown whether any of the prior art devices referred to herein have been patented and the inventor of the invention herein does not have possession of any written materials describing any of the prior art devices discussed herein such as the mouse, the stick or the pushbuttons. Since such devices are available for sale written materials describing them may exist.

SUMMARY OF THE INVENTION

The present invention relates to a control that uses movement to position an image on a screen for use with means for detecting the movement and a microprocessor that interprets the movement detected and means for displaying an image on a screen. The invention herein is used in a positioning system for positioning an image on a screen based on movement. One object of the invention was to provide for a convenient control to use with keyboards such as are commonly found with computers that would enable a user thereof to quickly develop an instinct and feel for the use of the control in making an image move up, down, left or right on a screen. Another object of the invention was to provide a control for the position of an image on a screen that would be highly sensitive and precise. Another object of the invention herein was to provide a control that could be used with existing means for detecting movement that already exists in the prior art.

The invention herein is a control comprising a body and a bar having a bar axis coupled to the body so that the bar is rotatable with respect to the body about the bar axis and is slideable with respect to the body in a direction parallel to the bar axis thereby permitting movement of the bar with respect to the body which is the movement that is used to position an image on a screen.

In a preferred embodiment the bar is rotatable with respect to the body only about the bar axis and is slidable with respect to the body only in a direction parallel to the bar axis. In one embodiment the bar has a plurality of surfaces that are of the same distance from the bar axis. In one embodiment the invention further comprises a first set of lines coupled to the bar and a second set of lines coupled to the bar. In a preferred embodiment the first set of lines are straight and are parallel to the bar axis and the second set of lines are perpendicular to the first set of lines. The first and second set of lines may be printed on paper which in turn may be coupled to the bar.

In another embodiment a shaft having a shaft axis is coupled to the body where the bar is coupled to the shaft so that the shaft axis is coaxial with the bar axis and the bar is rotatable about the shaft and slidable on the shaft.

In a preferred embodiment the bar has an exterior surface having a cylindrical shape and it is further preferred that the shape be that of a right circular cylinder. As such the bar can be mated to the body in the embodiment where the body has a notch and the bar is situated in a notch of the body. In the foregoing embodiment it is preferred that the body have a notch axis and an upper side having a concave surface that defines the notch of the body having the shape of a right circular cylinder disposed partially around the notch axis wherein the bar has an exterior surface having the shape of a right circular cylinder disposed around the bar axis and the bar axis is parallel to the notch axis.

In other embodiments of the invention a ball having a spherical surface is coupled to the bar so that the ball rotates when the bar rotates and the ball rotates when the bar is slid. A base may be coupled to the body so that the control can be secured to a keyboard by placing the base under the keyboard.

BRIEF DESCRIPTION OF THE DRAWINGS

FIG. 1 is a top perspective view of the embodiment of the control having a cylindrical bar in a partially cylindrical notch showing how the control is used in a positioning system with a keyboard where various parts of the positioning system other than the control are indicated primarily in diagram fashion.

FIG. 2 is a top perspective view of the control with the bar drawn above the body for the sake of clarity in illustrating the control.

FIG. 3 is a side plan view of the body with the bar removed.

FIG. 4 is the same view as FIG. 3 except that the bar is situated in the notch of the body.

FIG. 5 is a fragmentary perspective view of the embodiment of the bar having a plurality of surfaces.

FIG. 6 is a fragmentary perspective view of the embodiment of the bar having a first set and a second set of lines coupled to the bar.

FIG. 7 is a top perspective view of the embodiment of the control having a shaft.

FIG. 8 is a side plan view of the bar shown in FIG. 7.

DETAILED DESCRIPTION

Reference is now made to the accompanying drawings for a better understanding of the invention wherein all the parts are numbered.

In the embodiment shown in FIG. 1 a positioning system 67 is indicated generally. A positioning system 67 is for positioning an image 60 on a screen 61 based on movement of the invention herein which is the control 10. The positioning system 67 has means 64 for detecting movement of the control 10 and further has a microprocessor 63 coupled to the means 64 for detecting movement. The microprocessor 63 interprets the movement detected. The positioning system 67 further has means 62 for displaying the microprocessor's interpretation of the movement on a screen 61 coupled to the microprocessor 63. There exists in the prior art means 64 for detecting movement an example of which is commonly called a mouse. The exact details and construction of the mouse are unknown, however, the mouse may be used with the invention herein by virtue of the following. The mouse is used by placing it typically on the top of a desk and the entire mouse is moved on the desk which in turn causes an image 60 on a screen 61 to move. A spherical object protrudes out through the bottom of the mouse and makes contact with the user's desk. Movement of the mouse causes a spherical object to rotate in the mouse which rotation is detected and then fed into a microprocessor 63 and then to means 62 for displaying the microprocessor's interpretation of the movement on a screen 61 which is displayed in the form of an image 60. The mouse has no inherent up and down sense and the person using it has a great amount of difficulty in making the mouse move exactly up or exactly down or exactly in a straight line. This is important because one may desire to move the image 60 in exactly a straight line and this can only be accomplished by moving the mouse in a straight line. In addition, the mouse is typically situated on a person's desk and is difficult to reach and difficult to use because the mouse could be anywhere on the person's desk and is not situated in any one place. These two disadvantages are eliminated by the invention herein.

The microprocessor 63 is coupled to the means 64 for detecting movement by conventional means in the prior art such as by wires for carrying electrical signals. The exact manner of coupling the microprocessor 63 to the means 64 for detecting movement will depend on which prior art microprocessor 63 and which means 64 for detecting movement are chosen out of the variety that are now available for purchase which are designed to work together. The term microprocessor includes what is commonly called a computer which has many uses. The typical arcade video game also uses a microprocessor. The interpretation of the microprocessor 63 is electrical in nature and means 62 for displaying the microprocessors interpretation of the movement on a screen 61 are coupled to the microprocessor 63 by means known in the prior art. Means 62 for displaying the microprocessor's interpretation of the movement are readily available for purchase with a suitable microprocessor 63 designed to work with such means 62 for displaying the interpretation. The final result is that an image 60 is displayed on a screen 61. The cursor has many uses as is well known in the prior art. For example, in a computer typewriter the material to be typed is typically displayed first on a screen such as a video display tube and if one has made a mistake or desires to make a change one would cause the cursor to move to the place where the change or correction is to be made and then the appropriate input is made to the computer to accomplish the change. A cursor is also used in home video games and arcade video games to indicate for example the place at which a missle will be fired. To move the cursor or the image 60 on the screen 61 one typically has to physically move something to cause the image 60 to move. The invention herein is what is physically moved which in turn causes movement of the cursor or the image 60 on the screen 61. Thus, the invention herein is used in a positioning system 67 for positioning an image 60 on a screen 61.

The improvement in the positioning system 67 comprises a body 11 and a bar 22 having a bar axis 23 coupled to the body 11 so that the bar 22 is rotatable with respect to the body 11 about the bar axis 23 and is slidable with respect to the body 11 in a direction parallel to the bar axis 23 thereby permitting movement of the bar 22 with respect to the body 11 which is the movement which is used to position an image 60 on a screen 61. Thus, the invention herein is a control 10 that uses movement to position an image 60 on a screen 61 for use with means 64 for detecting the movement and a microprocessor 63 that interprets the movement detected and means 62 for displaying an image 60 on a screen 61.

A preferred embodiment of the control 10 is shown in FIGS. 2, 3, and 4. In FIG. 2 the bar 22 is shown above the body 11 for the sake of clarity. In FIG. 3 the left side 21 of the body 11 is shown with the bar 22 removed. In FIG. 4 the left side 21 of the body 11 is shown with the bar 22 in place. In the embodiments shown in FIGS. 1,2,3, and 4 the bar 22 is rotatable with respect to the body 11 only about the bar axis 23 and is slidable with respect to the body 11 only in a direction parallel to the bar axis 23. This results in a marked improvement over the prior art in that an image 60 on a screen 61 can be precisely moved in a straight line over a very precisely determined distance. The movement of the bar 22 parallel to the bar axis 23 will be detected by the means 64 for detecting the movement of the bar 22 and a microprocessor 63 will interpret the movement detected and means 62 for displaying an image 60 on a screen 61 will display an image 60 on a screen 61 that will be moved on the screen in a straight line such as from left to right on the screen 61 in many positioning systems 67 since it is very convenient to the person using the positioning system 67 to quickly learn that movement of the bar 22 parallel to the bar axis 23 will result in left to right or right to left movement of the image 60 on the screen 61. Typically the image 60 will move left if the bar 22 is moved left, that is, toward the left side of the drawing. The length 41 of the bar 22 shown in FIG. 2 should be such that sufficient sensitivity can be obtained. For example, it might be desired to have two millimeters of movement of the bar 22 correspond to one millimeter of movement of the image 60 on the screen 61. A bar 22 having a length 41 of 450 millimeters would be suitable for many purposes. Using a bar 22 of greater length 41 would increase the sensitivity in that large movement of the bar 22 parallel to the bar axis 23 could cause very small movement of the image 60 on the screen 61. The embodiment where the bar 22 slides only in a direction parallel to the bar axis 22 is particularly useful when the means 62 for displaying an image 60 on a screen 61 is being used to make a drawing where the image 60 will cause a line to appear on the screen 61 along the path that the image 60 has moved in. Straight lines that are only a fraction of a millimeter can be easily drawn on the screen 61 by use of the control 10.

Similar to the discussion immediately above having an embodiment where the bar 22 is rotatable with respect to the body 11 only about the bar axis 23 will allow the use of the control 10 to move an image 60 on a screen 61 exactly straight up on the screen 61 by rotating the bar 22 about the bar axis 23 in one direction and can cause the image 60 to go down on the screen 61 by rotating the bar 22 about the bar axis 23 in the opposite direction. It is contemplated that the control will be set on a desk and that the bar axis 23 will be horizontal which would be parallel to the surface of the desk. Therefore, it is apparent that upward rotation of the bar 22, that is rotating the bar 22 clockwise when looking at the right side 28 of the bar 22, will cause the image 60 on the screen 61 to move upward on the screen 61, that is, towards the top of the drawing, and that downward rotation of the bar 22, that is, counter clockwise rotation of the bar 22 about the bar axis 23 when viewed from the right side 28 of the bar 22, will cause the image 60 to move downward on the screen 61 that is towards the bottom of the drawing. A large rotation of the bar 22 about the bar axis 23 can correspond to a very small movement of the image 60 on a screen 61 and virtually any desired sensitivity can be obtained by use of the control 10 then. The control 10 would even permit one complete rotation of the bar 22 to correspond to even just a fraction of a millimeter of movement of the image 60 on the screen 61. For a bar 22 that has a cylindrical shape a radius 27 of eight to nine millimeters would be suitable for most purposes as shown in FIG. 4.

Movement of the bar 22 can be detected in several ways. One means 64 for detecting movement that exists in the prior art would direct electromagnetic radiation towards the exterior surface 25 of the bar 22 which would partially be reflected from the exterior surface 25 of the bar 22 towards a detector. The embodiment of the bar 22 partially shown in FIG. 5 has a plurality of surfaces 24 that are of the same distance 26 from the bar axis 23. It is contemplated that means 64 for detecting movement could direct electromagnetic radiation to the plurality of surfaces 24 of the bar 22 in a narrow ray so that rotation of the bar 22 would result in part of the ray being reflected back towards a detector when the bar 22 was aligned in the proper manner. It is further contemplated that the bar 22 would have to be in a precise position so that a ray of electromagnetic radiation could be reflected back to a detector. Slight movement of the bar 22 would cause a reflected ray to not hit the detector. In this manner the detector would receive a ray each time the bar 22 was in a precise position enabling the ray to hit the detector. This can be accomplished by having the plurality of surfaces 24 of the bar 22 each being flat and each being the same distance 26 from the bar axis 23. The embodiment shown in FIG. 5 illustrates a bar 22 that is shaped like a pentagon. Each time one of the five surfaces 24 of the bar 22 are aligned a ray would be precisely reflected back to a detector thereby the movement would be detected which then can be interpreted by a microprocessor 63 resulting in the positioning of an image 60 on a screen 61 by means 62 for displaying the image 60 on a screen 61. The foregoing could be used to move the image 60 on the screen 61 upwards or downwards. Similarly another detector using reflected electromagnetic radiation could sense the sliding of the bar 22 shown in FIG. 5 since the plurality of surfaces could cause a break in a reflected ray as the bar 22 is slid in a direction parallel to the bar axis 23 since there would be no reflection between the surfaces 24. The bar 22 shown in FIG. 5 could be coupled to the body 11 in the same manner as the bar 22 is coupled to the body 11 in FIG. 7 by mounting the bar 22 on a shaft 34 which will be discussed hereinafter. A bar 22 shown in FIG. 5 is shown in the shape of a pentagon for the sake of clarity and it is preferred that there be sufficient number of plurality of surfaces 24 of the bar 22 so that the exterior surface 25 of the bar 22 approaches that of a cylinder. This would result in the desired precision since a very small movement of the bar 22 could cause a reflected ray to move away from a detector thereby resulting in the detection of the movement.

In a preferred embodiment a first set of lines 31 are coupled to the bar 22 and a second set of lines 32 are coupled to the bar 22 as shown in the fragmentary view of a bar 22 shown in FIG. 6. The first set of lines 31 and second set of lines 32 will permit detection of movement of the bar 22 in a manner as previously described wherein a ray of electromagnetic radiation is directed towards the bar 22 and is partially reflected by the bar 22 back to a detector except when the bar 22 is moved so that the ray strikes one of the lines of the first set of lines 31 or second set of lines 32. Thus, movement of the bar 22 will in substance interrupt an electric signal caused by a ray of electromagnetic radiation not being reflected because the ray of electromagnetic radiation is striking one of the lines of the first set of lines 31 or the second set of lines 32. It is preferred that the first set of lines 31 are straight and are parallel to the bar axis 23 and the second set of lines 32 are perpendicular to the first set of lines 31 as shown in FIG. 6. Such an arrangement would simplify the task of detecting the movement of the bar 22. Similar to the prior discussion a ray of electromagnetic radiation could be directed to the exterior surface 25 of the bar 22 for the purpose of detecting the movement in the direction parallel to the bar axis 23 which movement could be indicated by breaks in the reflected ray of electromagnetic radiation caused by any of the lines in the second set of lines 32. Likewise, a second ray of electromagnetic radiation could be directed to the exterior surface 25 of the bar 22 and the reflection of such ray would be interupted by any of the lines in the first set of lines 31. Thus, movement in a direction parallel to the bar axis 23 can be detected as well as movement of the bar 22 about the bar axis 23. This embodiment could permit the detection of extremely minute movement of the bar 22. The first set of lines 31 and second set of lines 32 could be coupled to the bar 22 by printing the first set of lines 31 on paper 33 and printing the second set of lines 32 on the paper 33 and then coupling the paper 33 to the bar 22 by means of a suitable adhesive such as glue.

In one embodiment of the invention the control 10 further comprises a shaft 34 having a shaft axis 35 coupled to the body 11 wherein the bar 22 is coupled to the shaft 34 so that the shaft axis 35 is coaxial with the bar axis 23 and the bar 22 is rotatable about the shaft 34 and slidable on the shaft 34 as shown in FIG. 7. In this embodiment the bar 22 has a hole 30 from the left side 29 of the bar 22 through the bar 22 to the right side 28 of the bar 22 as shown in FIGS. 7 and 8. The hole 30 should have such shape that the bar 22 will be able to slide parallel to the bar axis 23 and rotate about the bar axis 23. The shaft 34 should be supported so that the bar 22 does not make contact with the body 11 which may be accomplished by a left support 37 and right support 36. The shaft 34 and the left support 37 and the right support 36 could be made from a metal rod that is bent in two places to form the left support 37, the shaft 34 and the right support 36. The left support 37 and the right support 36 could be coupled to the body 11 by molding the body 11 with the left support 37 and the right support 36 in place during molding. For example, the body 11 could be made from plastic. It is preferred that the hole 30 have a cylindrical shape and that the shaft 34 also have a cylindrical shape so that the bar 22 can be mated to the shaft 34 yet still rotate and slide with respect to the shaft 34.

In one embodiment the bar 22 has an exterior surface 25 having a cylindrical shape. It is further preferred that the bar 22 have an exterior surface 25 having the shape of a right circular cylinder. With such a bar 22 it is preferred that the body 11 have a notch 12 and the bar 22 is situated in the notch 12 of the body 11. The control 10 which is indicated generally in FIGS. 2 and 4 illustrate this embodiment. In said embodiment the body 11 has a notch axis 13 and an upper side 15 having a concave surface 16 that defines the notch 12 of the body 11 having the shape of part of a right circular cylinder disposed partially around the notch axis 13 wherein the bar 22 has an exterior surface 25 having the shape of a right circular cylinder disposed around the bar axis 23 and the bar axis 23 is parallel to the notch axis 13. In this embodiment the concave surface 16 that defines the notch 12 of the body 11 will hold the bar 22. The distance 14 between the notch axis 13 and the concave surface 16 of the body 11 should be essentially equal to the radius 27 of the bar 22 so the bar 22 will mate with the concave surface 16 that defines the notch 12 of the body 11 yet permit the bar 22 to rotate and slide with respect to the concave surface 16 that defines the notch 12 of the body 11 as shown in FIGS. 3 and 4. In this embodiment the notch axis 13 is essentially coaxial with the bar axis 23. Approximately eight to nine millimeters would be suitable for many applications for the distance 14 between the notch axis 13 and the concave surface 16 of the body 11 which would also be suitable for the radius 27 of the bar 22. The bar 22 and the concave surface 16 that defines the notch 12 of the body 11 should be made of materials that would permit the sliding and rotating of the bar 22 with the bar 22 situated in the notch 12 of the body 11 and plastic is one material that would be suitable. In this embodiment it is further preferred that the bar 22 be hollow to reduce weight and the friction so that the bar 22 can be easily slid and rotated.

In FIG. 1 a ball 38 is shown connected to the body 11 near the right side 28 of the bar 22 for the sake of clarity. It is preferred that the ball 38 be connected to the body 11 so that the ball 38 is half way between the left side 29 and right side 28 of the bar 22 when the bar 22 is positioned as shown in FIG. 1. The ball 38 has a spherical surface 39 coupled to the bar 22 so that the bar 22 is in contact with the spherical surface 39 of the ball 38 which will cause the ball 38 to rotate when the bar 22 is rotated or slid. Movement of the ball 38 may be detected in a manner similar to that described for detection of movement of the bar.

The invention herein may be used in a positioning system 67 that is designed and built around the control 10 or the invention herein may be used in a positioning system 67 that was not specifically designed for use with a control 10. In the latter situation a base 40 may be coupled to the body 11 so that the control 10 can be secured to a keyboard 65 by placing the base 40 under the keyboard 65 as shown in FIG. 1. The base 40 may be coupled to the body 11 by the use of adhesive or various fasteners and other devices available. It is preferred that the base 40 be flat and relatively thin so that the base 40 would fit under a keyboard 65. The weight of the keyboard 65 on the base 40 should hold the control 10 in position. A lip 42 may be coupled to the base 40 to further help prevent movement of the base 40. The lip 42 extends upward. It is preferred that the size of the base 40 and the dimensions of the base 40 be approximately the same size and dimensions as the keyboard 65. The control 10 should be positioned against the keyboard 65 so that the rear side 18 of the body 11 is against the keyboard 65 as shown in FIG. 1. Thus, the weight of the keyboard 65 on the base 40 and the contact of the rear side 18 of the body 11 with the keyboard 65 will provide a secure and convenient position for the control 10 to be used in. Frequently a microprocessor 63 is used with a keyboard 65 as well as with a screen 61 upon which information is displayed. Typically a person would position an image 60 on the screen 61 which in reality would be a cursor and then use the keyboard 65 to insert the information at the point that the image 60 is located at. This combination is a marked improvement over the prior art with respect to user convenience, ease of use, accuracy of positioning an image 60 on a screen 61 and greater sensitivity.

The body 11 may be made of various materials including plastic. The entire body 11 including the notch 12 may be made by using a mold. The ball 38 may also be made of plastic. Likewise, the base 40 may also be made of plastic and may be connected to the bottom side 17 or rear side 18 of the body 11.

The invention herein is a dramatic improvement over the prior art. Other prior art includes a stick similar to that used in many home video games where the stick is moved to the left to cause an image to move left or the stick is moved to the right to cause an image to move to the right and up to move an image up and down to move an image down. This type of stick requires the person using it to guess at how long the stick must be held to cause the image to move the required distance. This is pure guess work and results in tremendous inaccuracy. Other prior art devices include push buttons for each direction. For example, if it is decided to move the image to the left one would push the button for left movement. Again, the user must guess as to how long the button must be held down to accomplish the desired movement of the image which results in tremendous inaccuracies.

The following are some further disadvantages in the prior art. Both the mouse and the stick are displaced from the keyboard 65 which causes delay while typing because the typist has to take time to find the mouse or stick and move a hand a considerable distance to reach either. The typist is forced to stop looking at the screen 61 and to look elsewhere while trying to find the mouse or stick. In addition the mouse requires two dimensions to move in which presents a problem if the mouse is being used on a small desk because the user may push the mouse off the desk while watching the screen 61 or run out of room in which to move the mouse before moving the image 60 on the screen 61 to the desired point.

The foregoing disadvantages are overcome by the control 10 which is very close to the keyboard 65 which reduces the time to find the control 10. The body 11 stays close to the keyboard 65 so that the bar 22 is always within the same volume of space with reference to the keyboard 65 and therefore can be easily located without removing one's eyes from the screen 61. Furthermore, the bar 22 in essence moves in one dimension but because the bar 22 rotates movement equivalent to two dimensional movement can be obtained, that is, the image 60 can be moved up or down and sideways on the screen 61. The control 10 further saves space as it can be located right next to the keyboard 65 as shown in FIG. 1. The control 10 can be connected directly to the keyboard 65 so that the control 10 would require no desk space at all.

It is to be understood that the invention is not limited to the exact details of construction, operation or exact materials or embodiments shown and described, as obvious modifications and equivalents will be apparent to one skilled in the art, and the invention is therefore to be limited only by the scope of the appended claims.

I claim:

1. A control that uses both rotational movement and sliding movement to position an image on a screen for use with means for detecting the movement where the means for detecting senses the movement and a microprocessor that interprets the movement detected to position said image on said screen and means for displaying said image on said screen, comprising:
    a body having a concave surface defining a notch; and
    a cylindrical bar having a bar axis, said bar being matingly situated in the notch of the body for rotatable and slidable movement relative to the body, said bar being rotatable coupled to the body for movement about the bar axis and slidably coupled to the body for movement in a direction parallel to the bar axis, rotating movement of said bar causing said image to move in a first direction on said screen and sliding movement of said bar causing said image to move in a second direction on said screen.

2. The invention as claimed in claim 1 further comprising a plurality of flat surfaces that are coupled to the cylindrical surface of the bar so that the plurality of flat surfaces are of the same distance from the bar axis.

3. The invention as claimed in claim 1 further comprising a first set of straight lines coupled to the bar so that the first set of straight lines are parallel to the bar axis further comprising a second set of straight lines coupled to the bar so that the second set of straight lines are perpendicular to the first set of straight lines.

4. The invention as claimed in claim 1 further comprising a keyboard coupled to the body.

5. The invention as claimed in claim 1 further comprising a spherical ball like that of a mouse coupled to the bar.

6. The invention as claimed in claim 1 further comprising a base coupled to the body of the control where the base has a shape that will enable the base to be placed under a keyboard so that the control can be secured to a keyboard.

7. A positioning system for positioning an image on a screen based on both rotational movement and sliding movement, comprising:
    a body having a concave surface defining a notch;
    a cylindrical bar having a bar axis, said bar being matingly situated in the notch of the body for rotatable and slidable movement relative to the body, said bar being rotatably coupled to the body for movement about the bar axis and slidably coupled to the body for movement in a direction parallel to the bar axis, rotating movement of said bar causing said image to move in a first direction on said screen and sliding movement of said bar causing said image to move in a second direction on said screen;
    means for detecting movement where the means for detecting senses the movement of the cylindrical bar;
    a microprocessor coupled to the means for detecting movement that interprets the movement detected to position said image on said screen;
    means for displaying the microprocessor's interpretation of the movement by positioning said image on a screen coupled to the microprocessor; and
    a keyboard coupled to the microprocessor.

8. The invention as claimed in claim 7 further comprising a plurality of flat surfaces that are coupled to the cylindrical surface of the bar so that the plurality of flat surfaces are of the same distance from the bar axis.

9. The invention as claimed in claim 7 further comprising a first set of straight lines coupled to the bar so that the first set of straight lines are parallel to the bar axis further comprising a second set of straight lines coupled to the bar so that the second set of straight lines are perpendicular to the first set of straight lines.

10. The invention as claimed in claim 7 wherein the keyboard is coupled to the body.

11. The invention as claimed in claim 7 further comprising a spherical ball like that of a mouse coupled to the bar.

12. The invention as claimed in claim 7 further comprising a base coupled to the body where the base has a shape that will enable the base to be placed under the keyboard so that the body can be secured to the keyboard.

* * * * *